Jan. 9, 1962 C. J. STALEGO 3,015,842
APPARATUS FOR PRODUCING FIBERS
Filed Jan. 25, 1954 4 Sheets-Sheet 1

INVENTOR
CHARLES J. STALEGO
BY
ATTORNEYS

Jan. 9, 1962 C. J. STALEGO 3,015,842
APPARATUS FOR PRODUCING FIBERS
Filed Jan. 25, 1954 4 Sheets-Sheet 2

INVENTOR
CHARLES J. STALEGO
BY
ATTORNEYS

Jan. 9, 1962   C. J. STALEGO   3,015,842
APPARATUS FOR PRODUCING FIBERS
Filed Jan. 25, 1954   4 Sheets-Sheet 3

INVENTOR
CHARLES J. STALEGO
BY
ATTORNEYS

Jan. 9, 1962  C. J. STALEGO  3,015,842
APPARATUS FOR PRODUCING FIBERS
Filed Jan. 25, 1954  4 Sheets-Sheet 4
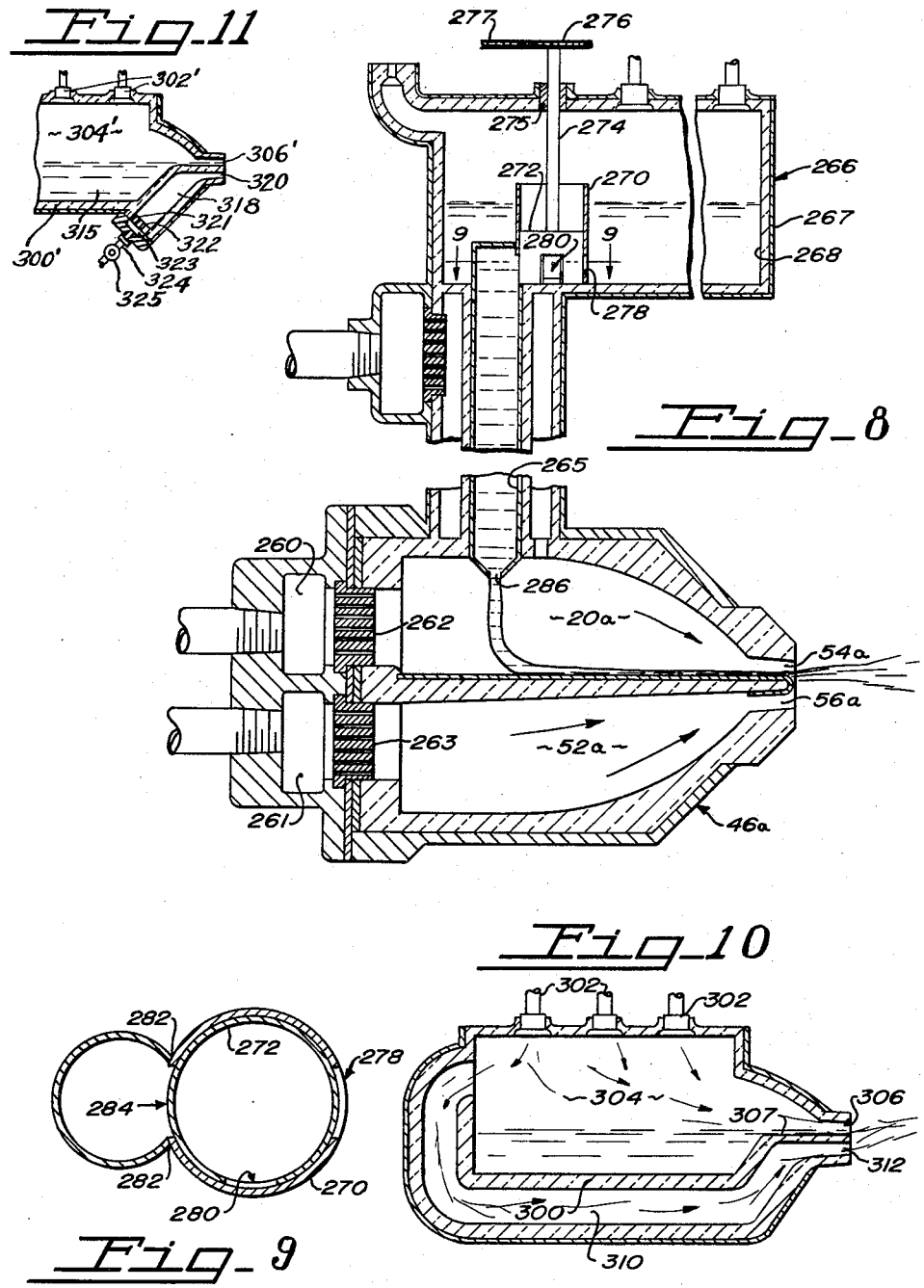
INVENTOR
CHARLES J. STALEGO
BY
ATTORNEYS 3,015,842
APPARATUS FOR PRODUCING FIBERS
Charles J. Stalego, Newark, Ohio, assignor to Owens-Corning Fiberglas Corporation, a corporation of Delaware
Filed Jan. 25, 1954, Ser. No. 405,765
4 Claims. (Cl. 18—2.5)

This invention relates to apparatus for producing fibers from heat-softenable materials such, for example, as glass.

Heretofore it has been a commercial practice to produce fine fibers from glass or other heat-softenable mineral materials by methods which include projecting one or more filaments or bodies of the heat-softenable, fiber-forming material into a gaseous blast formed of intensely hot, burned gases or products of combustion of a temperature exceeding the softening temperature of the material. A blast having the requisite characteristics for satisfactory fiber attenuation may be produced by a burner of the internal-combustion type having a chamber in which a combustible gaseous mixture is burned at a high rate of combustion, the burner having a restricted outlet opening or orifice through which the products of combustion are discharged at high velocities.

The gaseous discharge orifice is preferably elongated in a direction transversely of the chamber and has a cross-sectional area reduced with respect to the cross-sectional area of the chamber whereby the burned gases or products of combustion are discharged through the elongated orifice as a ribbon-like blast. The extremities of the filaments or bodies are softened by the heat of the blast and attenuated to fine fibers by the force of the blast.

Processes of this character involve certain heat losses as the filaments or bodies of fiber-forming material are derived from molten streams which solidify to form the filaments which are reheated upon entering the gaseous attenuating blast. Due to the fineness and high quality of fibers produced by this method, it has been extensively used commercially even though fiber production by this method is comparatively costly.

Another method involves the utilization of the combustion chamber of the burner, or a portion thereof, as a melting receptacle or container for glass wherein molten glass in the chamber flows toward an orifice and is drawn out from the burner orifice by the force or velocity of the products of combustion discharged through the orifice. In such arrangement, glass batch or glass cullet is introduced by a suitable feeding means into a combustion chamber whereby the glass batch or cullet is rendered molten by the heat of the burning gases within the combustion chamber, and the molten glass is discharged through the orifice and attenuated to fibers by the blast of burned gases.

The products of combustion within the combustion chamber are under pressure, and means must be provided for feeding the glass batch, cullet or molten glass into the chamber without loss of gas pressure within the combustion chamber. A feeding arrangement for effecting delivery of the fiber-forming material into a combustion chamber and a burner construction for carrying out the above-mentioned process are shown in my patent No. 2,663,903.

In the said process, the material-feeding means involves the use of a pair of gates or valves which are operated alternately in order to prevent escape of products of combustion during the periods in which the glass batch or material is fed into the combustion chamber. Such an arrangement functions intermittently to deliver material into the chamber. As the raw material introduced into the chamber is comparatively cool, substantial heat from the burning gases in the chamber is required to render the material molten for subsequent delivery through the blast discharge orifice.

Under these operating conditions, the temperature of the gases of the blast is subject to some variation and, hence, the velocity of the attenuating blast may be non-uniform, resulting in variation in size of the attenuated fibers. Although the fibers formed through this process are sufficiently uniform for use in certain products, they are not readily adaptable for use in the textile field as fiber uniformity is highly desirable in the production of fabrics and kindred products.

The present invention relates to an improved apparatus for delivering heat-softenable, fiber-forming material in a molten state into a zone of combustion or a blowing chamber in a manner wherein the temperature of the material at the zone of its entrance into the chamber or combustion zone approaches that of the gases in the chamber or zone into which the material is delivered whereby substantial variations in temperature of the products of combustion in the chamber are avoided or eliminated.

Another object of the invention resides in an apparatus for feeding molten glass or other mineral material into a chamber and burning a fuel mixture adjacent means for conveying glass or mineral material into the chamber in order to maintain the material in a highly flowable condition.

Another object of the invention is the provision of a furnace or receptacle adapted to contain molten glass or other mineral material in which pressure is established to direct the molten material into a blowing chamber or zone of intensely hot gases of combustion from which the gases are exhausted as a blast for attenuating the molten material to fibers.

Another object of the invention is the provision of an apparatus including a glass-melting receptacle in which a fuel mixture is continuously burned and the molten glass and products of combustion are discharged from a pressurized zone whereby the force of the discharged products of combustion draw or attenuate the molten material to fibers.

Another object of the invention relates to a means for feeding or delivering molten glass or other mineral material into a pressurized blowing chamber, the apparatus embodying a pumping or pressure means for conveying the molten glass or other material into the pressurized chamber.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a vertical sectional view illustrating semi-diagrammatically a form of apparatus for carrying out the method of the invention;

FIGURE 2 is a front end view of the burner or blow chamber;

FIGURE 3 is a sectional view taken substantially on the line 3—3 of FIGURE 1;

FIGURE 8 is a vertical sectional view illustrating semi-diagrammatically an arrangement for feeding molten material into a combustion chamber;

FIGURE 9 is an enlarged fragmentary horizontal view taken substantially on the line 9—9 of FIGURE 8;

FIGURE 10 is a vertical sectional view illustrating another form of apparatus for carrying out the method of the invention, and FIGURE 11 is a fragmentary sectional view showing a modified form of the apparatus illustrated in FIGURE 10.

Figure 4:
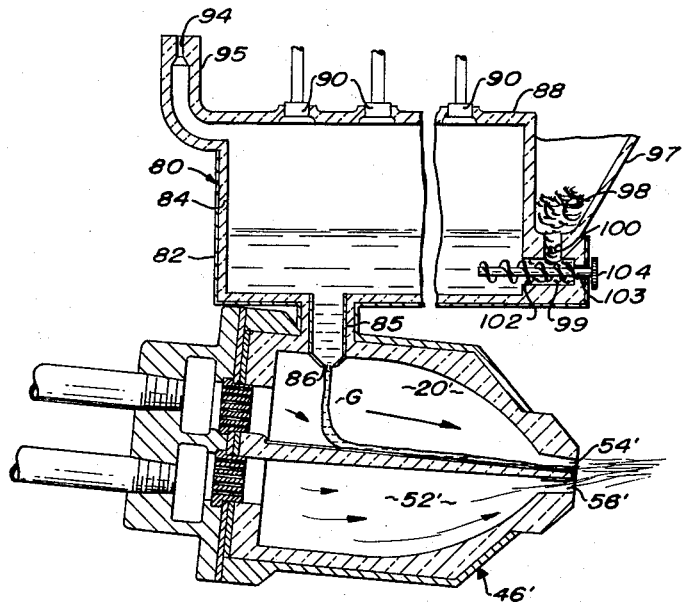
FIGURE 4 is a vertical sectional view illustrating semi-diagrammatically another form of apparatus for carrying out the method of the invention.

While the apparatus of the invention are especially adaptable and usable in the transfer of molten fiber-forming material from a supply to a confined zone or blowing chamber and the material attenuated to fibers by a gaseous blast discharged from the zone or chamber, it is to be understood that the apparatus of the invention may be employed for other purposes and with various materials wherever the method and apparatus may be found to have utility.

Referring to the drawings in detail and initially to the form of apparatus shown in FIGURES 1 through 3, there is illustrated an arrangement for delivering molten glass or other molten fiber-forming material into a chamber under a pressure head of the molten glass sufficient to feed the glass into a chamber in which combustible mixture is being burned. The products of combustion or burned gases are discharged from the chamber as a high velocity blast which attenuates the molten glass to fibers.

The apparatus includes a melting tank or furnace 10 adapted to contain a supply of molten glass. The tank or furnace preferably is formed with a metal shell or casing 12 lined with refractory 14 for containing the glass. Arranged in communication with the melting tank 10 is a tubular member 16 which may be formed of high-temperature-resistant metal, for example, platinum-rhodium, and which is adapted to convey molten glass into a combustion chamber 20. A zone of the tubular member or tube 16 may be shaped or constricted to provide a restricted orifice or outlet 22 for metering the glass flow into the chamber 20.

Means is provided for maintaining the glass in the tubular member 16 in a highly molten or flowable state. As shown in FIGURE 1, the tubular member 16 is surrounded by a refractory lining 24, and spaced from the lining 24 is a casing 26 lined with refractory 27 forming with the lining 24 an annularly shaped, vertically elongated combustion chamber 30 in which a combustible mixture is adapted to be burned.

A member 32 is associated with the upper portion of the wall structure defining the annular combustion chamber 30. The member 32 is formed with a boss portion 33 threaded to receive a pipe 34 connected with a supply (not shown) of fuel-and-air mixture, the pipe conveying the mixture to a manifold chamber 36 formed within the member 32. A wall 38, disposed in openings formed in the refractory lining 27 of chamber 30 and in member 32, is provided with a plurality of small passages 40 admitting combustible mixture into the annular combustion chamber 30 from the manifold.

The mixture is ignited and burned in the annular combustion chamber 30, the wall 38 forming a fire screen to avoid ignition of the mixture in the manifold 36. The burned gases or products of combustion from the annular chamber 30 may be discharged into the chamber 20 through an opening or orifice 42 formed in the refractory lining 44 defining the combustion chamber or confined zone 20 of a burner 46.

The combustion chamber 20 is disposed within a casing 48 of the burner. The burner construction shown in FIGURE 1 is of the general type shown in my Patent No. 2,663,903. The casing 48 is preferably formed of metal and at the section line 3—3 is of a generally oval configuration as illustrated in FIGURES 2 and 3. The refractory lining 44 extends entirely around the interior wall of the casing 48 as shown in FIGURE 3. A partition or wall 50 is centrally disposed within the space defined by the lining 44 and divides the interior of the burner into two chambers, 20 and 52. The refractory lining 44 converges at the nose end of the burner and, with the forward extremity of the partition 50, defines a restricted orifice 54 through which products of combustion are discharged from chamber 20 as a high velocity blast and a second restricted orifice 56 through which gases in chamber 52 are discharged as a high velocity blast.

Secured to the rear end of the burner casing 48 is a member 58. The member 58 is of hollow configuration and is formed with a partition or wall 60 which divides the interior into manifold chambers 62 and 64. The manifold chambers 62 and 64 are adapted to receive combustible mixture from a supply (not shown) through pipes 65 and 66.

Disposed between the chamber 20 and manifold 62 is a wall 67 provided with a plurality of small passages or openings 68 adapted to convey combustible mixture from manifold chamber 62 into combustion chamber 20, the perforated wall 67 forming a fire screen to prevent ignition of mixture in the manifold chamber 62. The combustible mixture introduced into chamber 20 through passages 68 is ignited and burned within the confined zone or chamber 20. The burning gases undergo great expansion, resulting in substantially complete burning of the mixture within the chamber 20, the burned gases or products of combustion being exhausted or discharged through orifice 54 as a high velocity blast.

It should be noted that the gases being burned within chamber 20 are supplemented by burned gases from the chamber 30 delivered into chamber 20 through the orifice 42. Through this arrangement, a comparatively large amount of intensely hot gases, viz., the products of combustion in both chambers 20 and 30, is discharged through the orifice 54 to produce a very high velocity gaseous blast. A stream of molten glass from the tubular member 16 is delivered continuously through the metering opening 22 into the chamber 20 and flows toward the orifice 54, the rapidly moving gases discharged through the orifice forming a high velocity blast which entrains and draws the molten glass from the orifice and attenuates the glass to fibers. The surface of the partition 50 within the burner 48 is preferably lined with a high-temperature-resistant metal lining 70 of platinum-rhodium or the like which resists erosion by the molten glass.

The liner 70 is preferably formed with channels 71 disposed at the transverse zones of the orifice 54 for the purpose of confining the glass stream entering the orifice within the width defined by the inner walls of the channels 71. The forward edge zone of the liner in the orifice may be formed with serrations or upwardly extending teeth or projections 72 facilitating the attenuation of the molten glass from the projections by the force of the blast.

The chamber 52, defined by the casing lining 44 and the lower surface of the refractory partition 50, is provided with a rear wall 73 formed with a plurality of passages or openings 74 through which combustible mixture from the manifold 64 is conveyed into the chamber 52. The mixture is ignited and burned in the confined zone provided by the chamber 52, the burning gases undergoing great expansion. The intensely hot, burned gases are discharged through the orifice 56 as a second high velocity blast. The blast discharged through the orifice 56 supplements or joins the blast of gases discharged through the orifice 54, providing a composite blast of substantial thickness, increasing the attenuating range and efficiency of attenuation of the molten glass to fibers.

Through this arrangement and method, the glass or fiber-forming material is delivered into the blowing or combustion chamber 20 in a molten condition under the influence of the heat generated by the burning gases in the annular combustion chamber 30 so that little or no heat is transferred to the molten glass in chamber 20 from the burning gases in the chamber. Through this method, the burning mixture in the chamber 20 retains substantially all its heat energy whereby the hot gases or products of combustion discharged or exhausted through orifice 54 provide a blast of extremely high velocity for attenuation purposes as substantially all of the energy is utilized to provide blast velocity for attenuation. The burning mixture in the chamber 52 retains substantially all its heat energy so that the gases discharged through the orifice 56 also provide a high velocity blast supplementing the blast of gases from the orifice 54.

The combustible mixture is admitted from the manifolds 62 and 64 into the chambers 20 and 52, respectively, under a pressure of from one to six pounds per square inch. In order to facilitate satisfactory delivery of molten glass into the chamber 20, the vertically disposed tubular member 16 is of sufficient length to establish a pressure head of molten glass greater than the pressure of gases in the chamber 20 whereby the molten glass will be continuously delivered under pressure through the orifice 22 into the chamber 20. The pressure head of the glass, providing a continuous stream of glass, prevents the escape of gases from chamber 20 through the body of glass contained in tubular member 16.

FIGURE 4 illustrates a form of apparatus wherein a pressurized, glass supply tank or furnace is arranged adjacent a burner or blowing chamber whereby molten glass or other molten material may be delivered into a a combustion chamber for attenuation to fibers by a gaseous blast exhausted or discharged from the chamber and by a supplemental gaseous blast. A burner construction 46' of substantially the same type as that shown in FIGURE 1 is utilized in the arrangement disclosed in FIGURE 4.

In this form of the invention, gas pressure is built up or established above or is effective upon the glass in the melting tank or receptacle 80 and, hence, the melting receptacle may be disposed close to the combustion burner 46'. The melting tank or furnace 80 is inclusive of a metal shell 82 to provide adequate strength for the tank, the shell being lined with a suitable refractory 84 of a type which will not be rapidly eroded by contact with molten glass. The receptacle is connected with a combustion chamber 20' of the burner 46' by means of a tube or duct 85 which is formed of heat-resistant metal, such as platinum-rhodium, and is constricted at its lower end to provide a restricted opening or orifice 86 serving to control, meter or determine the size of stream of glass G entering the combustion chamber 20' from the melting receptacle.

The upper wall or roof 88 of the furnace or melting tank 80 may be equipped with a plurality of burners 90 for burning combustible mixture as an open flame within the zone of the tank or furnace above the level of the molten glass within the tank or receptacle. As illustrated in FIGURE 4, the flames of the burners 90 are directed downwardly onto the glass contained in the tank or receptacle to melt the raw batch or cullet as it is introduced into the tank or furnace and to maintain the molten glass in a highly fluid condition to facilitate its flow or delivery through the tube 85 into the chamber 20'.

In the arrangement shown in FIGURE 4, the products of combustion or burned gases from the flame burners 90 may be exhausted from the tank 80 through a restricted vent opening 94 formed in a stack or pipe 95. The vent or restriction 94 may be of a size to cause the gases within the tank 80 to build up a pressure therein. The gas pressure should be of a value which, when added to the pressure of the head of glass in the tube 85 and tank 80, is slightly greater than the gas pressure developed by the burning gases in the combustion chamber 20. The establishment of pressure acting upon the body of glass in the receptacle 80 serves to force the molten glass through the orifice 86 and into the combustion chamber 20' and prevents gas flow or "blowback" from the chamber 20' through tube 85. The size of the vent opening 94 may be varied to regulate the pressure of gases in the tank 80 and thus control the rate of feed of the glass into the chamber 20'.

In the use of the burner 46', combustible mixture is introduced into the chambers 20' and 52' under a pressure of from one to six pounds, and hence the gas pressure in the tank 80 may be comparatively low in order to establish flow of molten glass through the tube 85 into the combustion chamber 20'.

The tank or furnace arrangement shown in FIGURE 4 is inclusive of means adaptable to feed raw glass batch or cullet, either continuously or intermittently, in a manner so as not to reduce or substantially change the pressure within the tank or furnace. Disposed adjacent the tank or furnace is a hopper 97 adapted to contain a supply of raw glass batch or cullet 98, the hopper being in communication with a cylindrical chamber 99 by means of a passage 100 formed in the base portion of the hopper construction.

Disposed longitudinally within the cylinder 99 is a feeding means in the form of a feed screw 102 carried on a shaft 103, the end of the shaft being formed with a sprocket 104 driven by a chain connected with a driving means (not shown). Rotation of the feed screw 102 in the proper direction conveys raw batch from the cylindrical chamber 99 into the tank 80 for admixing with the molten glass in the tank. The batch becomes softened adjacent the entrance of the feed screw into the tank 80 and, in conjunction with the raw batch in the cylinder 99 and passage 100, forms an effective seal for the tank to avoid escape of gases from the tank or furnace 80, and thus the pressure in the tank or furnace is maintained substantially constant.

The driving means for the chain-and-sprocket mechanism for actuating the feed screw 102 may be of a character to rotate the screw intermittently to discharge successive quantities of batch to the tank, or the feed screw may be rotated continuously to establish a constant feed of glass batch or cullet into the tank or furnace to replenish molten glass delivered into the burner chamber 20'. The stream of molten glass G in the chamber 20' flows toward the orifice 54' and is entrained in the stream of burned gases discharged through the orifice 54', the glass being attenuated to fibers by the velocity of the blast. The attenuation of the fibers is improved through the use of the supplemental or secondary blast of gases discharged through the orifice 56' from the combustion chamber or zone 52' as the gases of the blasts form a composite blast of substantial depth whereby the attenuating range is increased as compared with a single blast of gases emanating from a single orifice.

Figure 5:
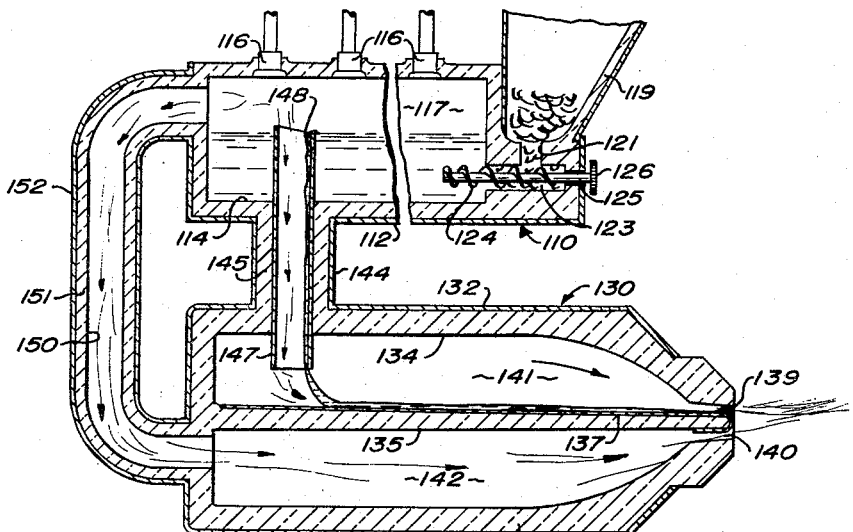
FIGURE 5 is a vertical sectional view showing another form of apparatus for performing the method.

Another form of apparatus for carrying out the method of the invention is illustrated in FIGURE 5. The arrangement includes a melting tank, furnace or receptacle 110 formed with a metal shell 112 which is lined with refractory 114 of a character resisting erosion by the molten glass. The tank 110 is provided with flame burners 116 for burning combustible mixture in a chamber 117 above the level of the glass in the tank 110. The flame burners 116 serve to reduce the raw glass batch or cullet to molten state and to maintain the glass in the tank in a flowable condition.

Disposed adjacent the tank is a hopper 119 in communication, by means of passage 121, with a cylindrical chamber 123 in which is rotatably disposed a feed screw 124 for advancing raw glass batch or cullet from the hopper 119 into the melting tank 110. The shaft 125 of the feed screw is equipped with a sprocket 126 driven by suitable means (not shown) for either intermittently or continuously rotating the feed screw in the proper direction to deliver the raw batch or cullet into the melting tank. In this arrangement, the melting tank 110 is of the closed type and is pressurized by the continuous introduction of combustible mixture by the flame burners 116 and the combustion of the mixture in the chamber 117.

Disposed directly beneath the melting tank 110 is a blowing chamber construction 130. The blowing chamber includes a metal casing 132 within which is disposed a lining or wall 134 of refractory material. The chamber 130 is of elongated configuration and is divided longitudinally by a partition 135 of the character shown in the burner 46 illustrated in FIGURE 1.

The upper surface of partition 135 is preferably lined with a metallic sheet 137 of platinum-rhodium or similar high-temperature-resistant material which resists wear. The refractory lining 134 is provided with walls converging toward the nose end of the blowing chamber and with the metal member 137, carried by the partition 135, forms orifices 139 and 140 which are restricted outlets for the discharge of gases from chambers 141 and 142, respectively, provided at opposite sides of the partition 135.

Disposed between the tank 110 and the blowing chamber 130 is a metal casing or sleeve 144 lined with refractory 145 within which is mounted a tube or tubular member 147, which may be formed of platinum-rhodium or the like, for conveying molten glass from the chamber 117 into the upper chamber 141. The upper extremity 148 of tube 147 is disposed at an elevation determining the height of the molten material desired in the chamber 117 of the melting tank. As the feeding means 124 delivers glass batch or cullet into the tank 110, the level of the molten glass is raised so that a stream of glass overflows the extremity 148 of tube 147 into chamber 141. The tubular member 147 is of a diameter substantially greater than the size of the glass stream flowing therethrough for the purpose of conveying burned gases or products of combustion from the chamber 117 above the molten glass into the blowing chamber 141. These gases, moving through blowing chamber 141, are discharged through the orifice 139 as a high velocity gaseous blast, the gases of the blast entraining the molten glass adjacent the orifice and attenuating the glass to fibers by the force of the blast.

The lowermost chamber 142 is connected with the melting tank by means of a passage 150 defined by refractory wall 151 enclosed in a metal casing or sheath 152, the passage having communication with the chamber 117 of the melting tank 110 above the level of the molten glass in the tank. The passage 150 is of a cross-sectional area substantially the same as that of the tube 147. Thus, approximately one half of the burned gases or products of combustion from chamber 117 in the melting tank flows through the passage 150 into the chamber 142 and is discharged through the orifice 140 as a second high velocity gaseous blast.

By utilizing a passage 150 and a tube 147 of equal cross-sectional area, substantially the same volume of gases will be discharged from each of the orifices 139 and 140. If the orifices 139 and 140 are of the same cross-sectional area and shape, the resulting dual blasts will be of substantially the same gas velocity. However, it is to be understood that the orifices may be of different sizes and shapes, dependent upon the desired relative velocities of the blasts which may be varied to modify the character of attenuation and size or average length of the fibers.

Figure 6:
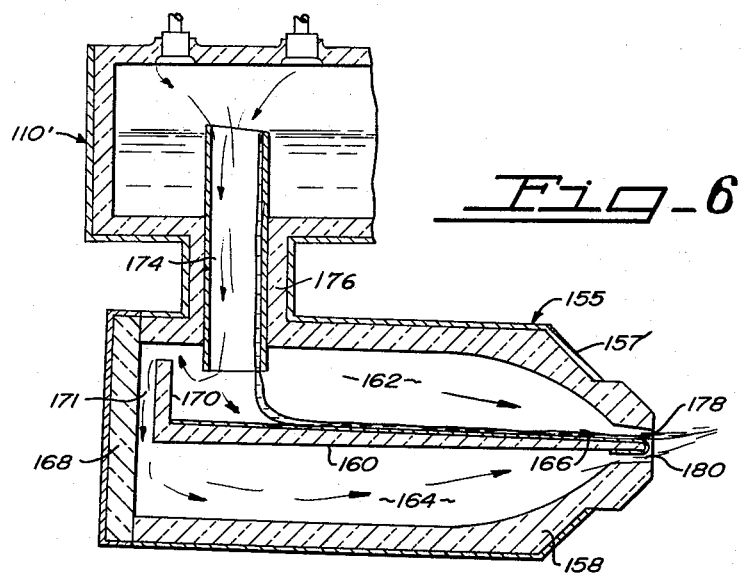
FIGURE 6 is a fragmentary sectional view illustrating a modified form of the apparatus shown in FIGURE 5.

FIGURE 6 illustrates a modified form of the apparatus shown in FIGURE 5. In this arrangement, a tank 110' of the same general construction as that shown in FIGURE 5 is disposed above a blowing chamber construction 155. The blowing chamber construction 155 includes a metal casing 157 within which is disposed a refractory lining 158. Disposed within the interior of the blowing chamber construction 155 is a partition 160 which divides the interior spaced defined by the lining 158 into chambers or zones 162 and 164.

The upper surface of partition 160 supports a metal plate 166 of high-temperature-resistant material of the same construction as member 137 shown in FIGURE 5. The partition 160 is spaced from a rear wall 168 of the blowing chamber construction 155 and is formed with an upwardly extending wall or baffle 170, the upper terminus of which is spaced from the refractory lining 158. The space between the walls 168 and 170 provides a passage 171 establishing communication between the rear zones of chambers 162 and 164.

The melting tank 110' is in communication with chamber 162 by means of a tube 174 which is of the same construction as tube 147 shown in FIGURE 5. The tube 174 is preferably surrounded by a refractory wall or column 176 to minimize heat losses. The tube 174 is adapted to convey a stream of molten glass into the chamber 162 from the tank as in the construction shown in FIGURE 5. In addition, the tube 174 conveys the burned gases or products of combustion from the flame blowers associated with the tank 110' into the chamber 162.

A portion of the gases entering chamber 162 moves through the passage 171 into chamber 164. The gases from chamber 162 are discharged through a restricted orifice 178 as a high velocity blast, and the gases moving through chamber 164 are discharged through orifice 180 as a second high velocity blast. The gases moving through orifice 178 draw the molten glass from the orifice, the velocity of the gases of the blast attenuating the molten glass to fibers.

The blast formed by gases discharged from chamber 164 through orifice 180 supplements the gaseous blast from orifice 178; and due to the added volume of intensely hot gases of the second blast joining the first blast, the attenuating range is increased. If it is desired that the velocities of the gaseous blasts from the orifices 178 and 180 be substantially the same, the cross-sectional area of the passage 171 should be substantially one half that of the tube 174 if the orifices are of the same cross-sectional area. If it is desired to establish blasts of different velocities, this may be accomplished by modifying the ratio of the cross-sectional area of tube 174 with respect to the cross-sectional area of passage 171 or changing the sizes of the discharge orifices 178 and 180.

Though the arrangement shown in FIGURE 6, the products of combustion and the glass stream from the melting tank 110' are delivered through the single tube 174 into the chamber 162. It is preferable to incline the blowing chamber construction slightly downwardly from a horizontal plane to enhance the flow of the molten glass deposited upon the plate or liner 166 toward the orifice 178. Through this arrangement, the heat of the gases in the tank 110' melts the raw glass batch and the velocity of the gases is employed to attenuate the molten glass to fibers.

Figure 7:
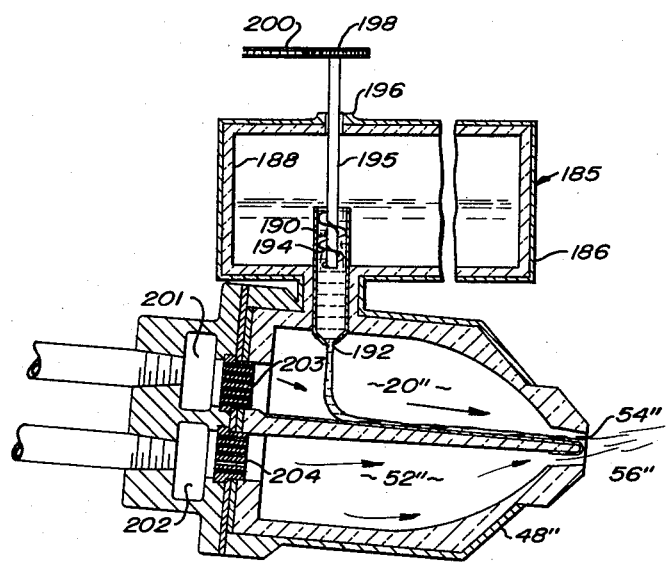
FIGURE 7 is a vertical sectional semidiagrammatic view illustrating another arrangement for delivering molten material into a combustion chamber.

FIGURE 7 illustrates a form of apparatus involving mechanical means for feeding or pumping molten glass into a blow chamber construction by establishing pressure upon the column of molten glass to be delivered into the chamber 20" and to avoid transmission of gases from the chamber into the glass-melting tank or receptacle. This form of apparatus utilizes a burner 48" which is of the same character as that shown in FIGURE 4 having combustion zones or chambers 20" and 52", chamber 20" being provided with an orifice 54" and chamber 52" being provided with an orifice 56".

The tank 185 is preferably disposed immediately above the burner 48" and includes a metal casing 186 lined with suitable refractory 188. The tank 185 may be associated with a melting furnace to receive molten material from the furnace, or a tank of the character shown in FIGURE 5 may be utilized. In the form of construction shown in FIGURE 7, the tank 185 need not be pressurized as the molten glass is fed from the tank to the chamber 20" by pressure set up by mechanical means.

Arranged between tank 185 and chamber 20″ is a vertically disposed tube 190 adapted to convey molten glass from tank 185 to chamber 20″. The tube 190 preferably is formed at its lower extremity with a restricted orifice or opening 192 for metering or controlling the flow of molten glass into the chamber 20″. Disposed in tube 190 is a glass-feeding means or feed screw 194 having a shaft 195 supporting the feed screw and extending upwardly through a bearing 196 carried by the upper wall of tank 185. The shaft may be provided with a sprocket 198 connected to a motor or other driving means by a chain 200 whereby the shaft 195 and feed screw 194 may be rotated in the proper direction to feed the molten glass downwardly through tube 190 into the chamber 20″.

Constant rotation of the feed screw 194 establishes a constant, downwardly acting pressure on the molten glass in tube 190 to cause a continuous stream of glass to flow through the orifice 192. The chambers 20″ and 52″ are adapted to receive combustible mixture from manifolds 201 and 202 through passages in fire screens or walls 203 and 204. The combustible mixture is ignited and burned in the chambers 20″ and 52″, and the burned gases or products of combustion are discharged through orifices 54″ and 56″ as high velocity gaseous blasts. The glass delivered by the pumping means into chamber 20″ is urged to flow to the orifice 55″ by the intensely hot gases and is attenuated to fibers by the force of the gases of the blasts emanating from both orifices of the burner. The pressure exerted by the feed screw 194 on the column of molten glass in tube 190 is greater than the pressure of the burning gases in the chamber 20″ and, hence, the gases are prevented from moving upwardly through tube 190. Through the arrangement shown in FIGURE 7, the glass is pumped or fed by mechanical means into a blowing or combustion chamber without pressurizing the melting furnace or glass supply tank.

FIGURES 8 and 9 are illustrative of another form of apparatus for delivering molten glass from a pressurized supply receptacle to a burner and preventing gases from the burner escaping to the glass supply. The burner 46a shown in FIGURE 8 is of the type shown in FIGURES 4 and 7 and includes combustion chambers 20a and 52a. Combustible mixtures are continuously introduced into these chambers from manifolds 260 and 261 through passages formed in walls or fire screens 262 and 263, the combustible mixtures being burned concurrently in the chambers 20a and 52a.

The products of combustion from the chamber 20a are discharged through a restricted orifice 54a and the products of combustion from chamber 52a are discharged through orifice 56a. The combustion chamber 20a is provided with a tube or duct 265 which extends into a melting tank or supply receptacle 266 containing molten glass. The tank is preferably formed with a metallic outer casing 267 lined with refractory material 268. The upper end of the tube 265 extends into the interior of the tank 266 as illustrated.

Disposed adjacent the upper portion of the tube 265 is a relatively stationary sleeve or member 270 within which is a rotary valve member 272. The valve member 272 is mounted upon a shaft 274, the shaft projecting through a bearing 275 disposed in an opening in an upper wall of the tank 266. The shaft 274 may be equipped with a sprocket 276 driven from a suitable source of power by a chain 277. The sleeve 270 is provided with an opening or port 278. The valve members 272 is of inverted cup-like configuration and the side wall thereof is formed with an opening or port 280.

The upper portion of tube 265 joins with the stationary sleeve 270 at the zones 282. Rotation of the valve member 272 effects a periodic or intermittent delivery of a quantity of molten glass from the supply in the pressurized tank 266 into the tube 265. During rotation of the shaft 274 and valve member 272, the port 280 in the valve member 272 moves into registration with the port 278 provided in the sleeve 270. When the ports 278 and 280 are in registration, molten glass in the tank 266 flows through the ports into the interior of the valve 272.

The molten material then contained within the hollow interior of valve 272 is retained within the valve until rotation of the valve brings port 280 into registration with the open zone 284 of the upper end of the tube 265. Registration of the port 280 with the open zone 284 provides a path or passage through which the molten glass in the interior of valve 272 flows into the tube 265 and is conveyed into the combustion chamber 20a.

Upon continued rotation of valve 272, port 280 again registers with port 278 and molten glass again flows into the interior of the valve 272. This cycle is repeated, and with each complete rotation of valve member 272 a predetermined quantity of glass within the valve 272 is delivered into the combustion chamber 20a.

The quantity of molten glass and the frequency of the intervals at which the quantities or charges are delivered into the tube 265 may be varied by changing the speed of rotation of the valve member 272. This may be accomplished by incorporating variable speed drive means (not shown) associated with the chain drive 277. If desired, the lower end of the tube 265 may be constricted to form a restricted orifice 286. Successive charges of molten glass are delivered under pressure into the tube 265, but the restricted orifice provides for a relatively small, continuous stream of glass into the chamber 20a.

By means of the illustrated arrangement, the flow of gases from the chamber 20a into the glass supply in the tank 266 is prevented. The molten glass delivered into the chamber 20a flows toward the orifice 52a, and the burned gases discharged through the orifice 54a as a high velocity blast attenuate the glass to fibers by the force of the blast. The burned gases resulting from combustion in the chamber 52a are discharged through the orifice 56a, providing a second blast joining or augmenting the first to form a composite blast of intensely hot gases, providing a greater attenuating range by reason of the increased depth of blast provided by gases discharged through both orifices 54a and 56a.

FIGURE 10 is illustrative of another form of apparatus for forming fibers from molten glass or similar fiber-forming material. In FIGURE 10 there is illustrated a receptacle 300 adapted to receive raw glass batch or cullet by a suitable feeding means (not shown) in the manner illustrated in the apparatus shown in FIGURE 4.

The receptacle or tank 300 is provided with flame burners 302 for burning combustible mixture in the zone or chamber 304 containing the glass. The combustion of the mixture in the zone 304 provides heat for reducing the glass batch to a molten state and pressurizes the chamber. The forward portion of the tank 300 is formed with a restricted orifice 306 through which products of combustion resulting from burning of the gases in the zone 304 are discharge through the orifice 306 as a high velocity gaseous blast. The level of the molten glass within the chamber or tank 300 is maintained slightly above the surface 307 of the orifice 306 whereby the molten glass is readily entrained at the orifice by the gases moving through the orifice 306 so that the glass is drawn into fine fibers by the velocity of the gases of the blast.

The raw batch or cullet may be introduced into the chamber 304 below the level of the molten glass therein by mechanical feeding means (not shown) of the type shown in FIGURES 4 and 5 wherein a rotary screw feeds the material into the chamber. The molten material or glass in the chamber 304 is under the pressure of the combustible mixture being continuously introduced into and burned within the chamber 304 by the flame burners 302.

The arrangement shown in FIGURE 10 is inclusive of a passage 310 which conducts a portion of the gases or products of combustion from chamber 304 for discharge through an orifice 312 as a second high velocity blast. The gaseous blast from the orifice 312 augments or joins the blast of gases emanating from orifice 306 to provide an increased range of attenuation as the composite blast is of greater thickness and retains its fusion or attenuating temperature through a greater distance from the orifices.

FIGURE 11 is illustrative of a modified form of the construction shown in FIGURE 10. A tank or receptacle 300' is formed with an interior chamber 304' adapted to contain molten glass or other heat-softenable, fiber-forming material 315. An upper wall of the tank 300' may be provided with flame burners 302' for introducing combustible mixture into chamber 304', the mixture being burned within the chamber. The burned gases or products of combustion in the chamber 304' are discharged through a restricted orifice 306' as a high velocity blast.

The intensely hot gases within the chamber 304' discharged through the orifice 306' entrain molten glass 315 at the orifice 306', the glass being drawn or attenuated to fibers by the force of the blast. The raw glass batch or raw material in comminuted form may be introduced into the chamber 304' beneath the level of the molten glass 315 by feeding means such as that shown in FIGURES 4 and 5 wherein a rotating screw conveys the raw batch or material from a hopper or other source of supply into the pressurized chamber 304'.

In the form of construction shown in FIGURE 11, a second combustion chamber or confined zone 318 is disposed adjacent the chamber 304', the chamber 318 being provided with a restricted orifice 320. The rear wall 321 of the chamber 318 is provided with small passages 322 for admitting combustible mixture from a manifold 323 into the chamber 318. The manifold is in communication with a supply (not shown) of combustible mixture by means of a pipe 324, a valve 325 being associated with the supply pipe 324 for controlling the flow of combustible mixture to the burner chamber 318. The combustible mixture admitted into the chamber or confined zone 318 is completely burned within the chamber, and the intensely hot gases or products of combustion are discharged through the orifice 320 as a secondary blast which joins or augments the gases discharged through orifice 306' to form a composite blast.

It should be noted that, in accordance with the method herein disclosed, the glass or other heat-softenable, fiber-forming material is contained in a pressurized tank, receptacle, chamber or furnace and is acted upon by a gaseous blast from a combustion burner or blowing chamber for attenuating the molten material to fibers by the force or velocity of a gaseous blast or blasts. In the method disclosed, the molten glass is maintained in a pressurized zone or zones in the presence of burning gases or gases at temperatures well above the melting point of the glass or other fiber-forming material or the molten material is pumped into a combustion or blowing chamber so that the molten glass is readily entrained in a gaseous blast without appreciable transfer of heat from the gases to the molten material. Thus, improved attenuating efficiency is attained as the attenuation is carried on by intensely hot gases at temperatures well above the attenuating temperatures of the glass or fiber-forming material.

It is apparent that, within the scope of the invention, modifications and different arrangements may be made other than is herein disclosed, and the present disclosure is illustrative merely, the invention comprehending all variations thereof.

I claim:

1. Apparatus of the character disclosed including, in combination, a burner having a combustion chamber elongated in a generally horizontal direction, means for delivering combustible mixture into one end of the chamber adapted to be burned within the chamber, a restricted orifice formed in the wall defining the other end of the chamber, tubular means extending upwardly from the burner adapted to contain a supply of molten fiber-forming material, said tubular means being formed with a restricted outlet in communication with the chamber through which the molten material flows into the chamber in a direction generally normal to the path of flow of gases through the chamber, the pressure of the material at the outlet being greater than the pressure of the gases within the chamber, a second combustion chamber in heat-transferring relation with the tubular means, means for delivering combustible mixture into said second chamber adapted to be burned therein for heating the material in the tubular means, and a passage connecting the second chamber with the first mentioned chamber whereby the burned gases in the second chamber are delivered into the first mentioned chamber for discharge through the restricted orifice in the burner end wall, the forces of the blast provided by the gases discharged through the orifice attenuating the material in the first mentioned chamber to fibers.

2. Apparatus of the character disclosed including, in combination, a burner having a combustion chamber elongated in a generally horizontal direction, means for delivering combustible mixture into one end of the chamber adapted to be burned within the chamber, a restricted orifice formed in the end wall of the other end of the chamber through which burned gases are discharged as a high velocity blast, said chamber having a substantially horizontal bottom wall, a receptacle adapted to contain a supply of molten fiber-forming material, said receptacle being formed with a restricted outlet in communication with the chamber intermediate its ends through which the molten material flows into the chamber onto the horizontal bottom wall of the chamber, a second combustion chamber in heat-transferring relation with the receptacle, means for delivering combustible mixture into said second chamber adapted to be burned in said chamber for heating the material in the receptacle, and a passage connecting the second chamber with the first mentioned chamber whereby the burned gases in the second chamber are delivered into the first mentioned chamber for discharge through the restricted orifice in the burner end wall, the velocity of the gases of the blast drawing the molten fiber-forming material on the horizontal bottom wall through the orifice in the end wall and attenuating the material to fibers.

3. Apparatus of the character disclosed including, in combination, a burner formed with a horizontally disposed combustion chamber, means arranged in a wall of the burner at one end of the chamber for admitting combustible mixture adapted to be substantially completely burned within the chamber, a restricted orifice formed in the wall defining the other end of the chamber through which the burned gases are projected as a high velocity gaseous blast, a tubular means disposed adjacent the burner adapted to contain a supply of molten glass, said tubular means having a portion extending into the burner chamber and having a restricted outlet through which a stream of molten glass flows into the chamber, a second chamber arranged adjacent the tubular means, means for delivering combustible mixture into the second chamber, a passage connecting said burner chamber and said second chamber, the mixture delivered into the second chamber being burned in said chamber and the burned gases discharged through the passage into the first mentioned chamber, the heat of the gases in the second chamber maintaining the glass in the tubular means in flowable condition, the molten glass in said first mentioned burner chamber being discharged through the orifice in the burner wall whereby the blast of burned gases moving through the restricted orifice attenuates the glass to fibers.

4. Apparatus of the character disclosed including, in combination, a burner formed with adjacent combustion chambers, a horizontally disposed wall between the chambers, means arranged in a wall of the burner at one end of the chamber for admitting combustible mixture into both chambers adapted to be substantially completely burned within the chambers, a pair of restricted orifices formed in the wall defining the other end of the chambers through which the burned gases are projected as a pair of high velocity gaseous blasts, a tubular means extending upwardly from the burner adapted to contain a supply of molten glass, said tubular means extending into one of the burner chambers and having a restricted orifice through which a stream of molten glass flows into the chamber onto the horizontally disposed wall, a confined zone surrounding the tubular means, means for delivering combustible mixture into the confined zone, a passage between the burner chamber receiving the stream of glass and the confined zone, the mixture delivered into the confined zone being burned therein and the burned gases discharged through the passage, the heat of the gases in the confined zone maintaining the glass in the tubular means in flowable condition, the pressure of the glass in said tubular means being greater than the pressure of the gases in the chamber receiving the glass, the glass on the horizontally disposed wall being discharged through one of the orifices in the burner wall and the forces of the gaseous blasts from both orifices attenuating the glass to fibers.

References Cited in the file of this patent

UNITED STATES PATENTS

| | | |
|---|---|---|
| 2,455,908 | Slayter | Dec. 7, 1948 |
| 2,554,486 | Austin | May 29, 1951 |
| 2,578,707 | Kocher | Dec. 18, 1951 |
| 2,603,833 | Stalego et al. | July 22, 1952 |
| 2,624,912 | Heymes et al. | Jan. 13, 1953 |
| 2,626,484 | Stalego | Jan. 27, 1953 |
| 2,663,903 | Stalego | Dec. 29, 1953 |

FOREIGN PATENTS

| | | |
|---|---|---|
| 610,845 | Great Britain | Oct. 21, 1948 |